235-379 SR

11/16/82 OR 4,359,630

United States Patent [19]

Simonotti et al.

[11] 4,359,630

[45] Nov. 16, 1982

[54] APPARATUS FOR DEPOSITING AND/OR WITHDRAWING BANK-NOTES BY MEANS OF CREDIT CARDS

[75] Inventors: Lucio Simonotti, Banchette d'Ivrea; Mario Sella, Turin, both of Italy

[73] Assignee: Ing. C. Olivetti & C., S.p.A., Ivrea, Italy

[21] Appl. No.: 227,239

[22] Filed: Jan. 22, 1981

[30] Foreign Application Priority Data

Jan. 25, 1980 [IT] Italy .............................. 67105 A/80

[51] Int. Cl.[3] .............................................. G06K 5/00

[52] U.S. Cl. .................................... 235/379; 235/380; 235/419

[58] Field of Search ................ 235/379, 380, 419, 437

[56] References Cited

FOREIGN PATENT DOCUMENTS 55-3008 1/1980 Japan .................................. 235/379

*Primary Examiner*—Harold I. Pitts
*Attorney, Agent, or Firm*—Edward F. McKie, Jr.

[57] ABSTRACT

The apparatus is controlled by a credit card following customer identification, and comprises a series of peripheral units operable by a central unit 10 in accordance with a determined program. The apparatus is normally supplied by mains voltage, and comprises a relay device 34 sensitive to voltage drop in order to connect the apparatus to an electric battery 36. A counter 48 arranged to decode the stage of the program under execution induces an emergency cycle controlled by a timer 44, of which the times coinciding with said stage selectively operate the peripheral units, in order to perform the essential functions for closing the interrupted transaction in a defined manner which is intelligible to the central unit.

12 Claims, 5 Drawing Figures

APPARATUS FOR DEPOSITING AND/OR WITHDRAWING BANK-NOTES BY MEANS OF CREDIT CARDS

BACKGROUND OF THE INVENTION

This invention relates to an apparatus for depositing and/or withdrawing bank-notes by means of credit cards, comprising a central unit and a series of peripheral units operable by said central unit in accordance with a program corresponding to determined commands.

Such apparatus are generally disposed in public places, and are operated directly by the customer.

Apparatus of the aforesaid type are known equipped with a relay device, which if the electricity is interrupted provides for supplying the various devices by means of an alternative energy source, for example electrical accumulators possibly associated with auxiliary electrical generators. These devices are generally very costly, and are often of poor reliability. This is because they are provided in order to ensure continuity of operation of the apparatus, but do not provide for the possibility of interruption of the alternative source, because of which defective or incomplete operation can occur, with great risk to the interests of the customer or the bank due to possible mistakes in the recording of the transactions.

The technical problem which the invention proposes to solve consists of providing, in an apparatus for depositing and/or withdrawing bank-notes of the aforesaid type, a relay device which ensures the safety of the transaction which has commenced, and excludes subsequent operations for the duration of the interruption in the mains electricity supply.

SUMMARY OF THE INVENTION

This problem is solved by the apparatus according to the invention, which comprises a power supply unit operated by the mains voltage in order to supply said central unit and said peripheral units, and a relay device sensitive to a drop in said mains voltage in order to connect an electric battery to said power supply unit, and is characterised by means which indicate the stage of the program executed when said interruption occurs, in order to give rise to a modification of said program which depends on said stage.

BRIEF DESCRIPTION OF THE DRAWINGS

This and further characteristics of the invention will be more apparent from the description given hereinafter of a preferred embodiment by way of non-limiting example, with the aid of the accompanying drawings, in which.

DESCRIPTION OF THE PREFERRED EMBODIMENTS

Figure 1:
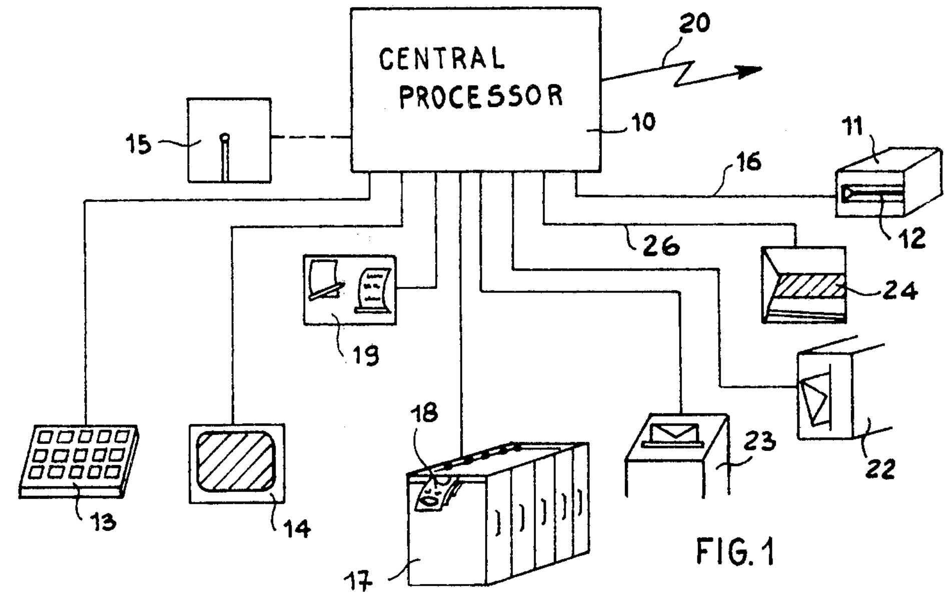
FIG. 1 is a block diagram of an apparatus for depositing and/or withdrawing bank-notes, according to the invention.

The bank-note depositing and withdrawal apparatus incorporating the invention comprises a central unit 10, for example a microprocessor, arranged to control a series of peripheral units. This series of peripheral units comprises a reading and recording device 11 for a credit card, able to receive the credit card in a slot 12 and to transfer it into a reading and recording zone.

The credit card contains a read-only track carrying a set of identification data, and another reading and writing track carrying the accounting data which allow and record the withdrawal of a determined sum within a fixed period or cycle. The device 11 identifies the customer by combining, under the control of the central unit 10, the data read from the read-only track of the credit card with a secret identification number which the customer executes on a keyboard 13 disposed on the front panel 9 of the apparatus (FIG. 2), under the guide of information which the unit 10 displays on a luminous screen 14.

The device 11 (FIG. 1) comprises a receptacle into which credit cards to be seized are fed following a predetermined number of unsuccessful attempts to use them, or if the credit card is recognised as mislaid by the owner from a list of credit cards recorded for example on a magnetic disc unit 15. For this purpose, the central unit 10 is arranged to generate a signal which by way of a connector 16 controls the feeding of the credit card to the receptacle.

The apparatus also comprises a bank-note dispensing unit 17, which comprises one or more drawers, each for containing the bank-notes of a corresponding size. After the credit card has been checked by the unit 11, the unit 17 is controlled by the central unit 10 on the basis of the number executed on the keyboard, in such a manner as to withdraw a determined number of bank-notes of the various sizes and to collect them into a wad which is then presented to the customer at a slot 18 in the front panel 9 (FIG. 2) of the apparatus. It also comprises a printer 19 (FIG. 1) which issues a receipt for the effected transactions through a slot 21 in the panel 9 (FIG. 2). When the unit 17 has dispensed the required bank-notes, the central unit 10 controls the unit 11 (FIG. 1) such that it updates on the reading and writing track of the credit card the sum which can still be withdrawn within the given period, after which the unit 11 returns the credit card to the customer through the slot 12. In addition, if the apparatus operates off-line, the central unit 10 causes the transaction which has taken place to be recorded on an appropriate section of the magnetic disc of the unit 15. If however the apparatus operates on-line, the central unit 11 transmits the transaction data through a line 20 to the central computer.

The apparatus also comprises an envelope dispensing unit 22, which is operated under the control of the central unit 10 following the identification of the customer by the unit 11 on the basis of the credit card as seen heretofore, and on executing the required type of transaction on the keyboard 13. The customer can then place bank-notes to be deposited inside the envelope dispensed in this manner. He then reinserts the envelope containing the bank-notes into an envelope collection unit 23, which stamps the envelope and feeds it to a deposit drawer. The devices 22 and 23 are accessible on the panel 9, and are controlled by the central unit 10 under the control of the keyboard 13 and device 11, whereas the unit 10 controls the printer 19 for printing a receipt for the deposit which has taken place.

The keyboard 13, the screen 14 and the slots disposed on the panel 9 for access to the unit 17, to the printer 19 and to the devices 22 and 23 heretofore described are protected by an anti-vandal slide-plate 24, which is driven by a servomotor controlled by the central unit 10 by way of a connector 26. The slide-plate 24 is normally closed and is opened only when a credit card is inserted into the slot 12 of the unit 11 and recognised as valid by the unit 11. For this purpose, the unit 11 comprises a shutter which is normally closed and arranged to allow only partial insertion of the credit card. This is then tested to establish whether the object introduced has the dimensions, generally the width, of a credit card and whether it is provided with the magnetic strip. If the result of these two tests is positive, the shutter is opened, so that the credit card continues its path within the unit 11. Immediately afterwards, the central unit 10 causes the credit card to be read by the reader 11, which effects the required validity checks. If these checks are positive, the central unit 10 emits a signal to the connector 26, which causes the slide-plate 24 to open. This is then raised and disappears in a slot 27 in the panel 9, as shown in FIG. 2.

Figure 2:
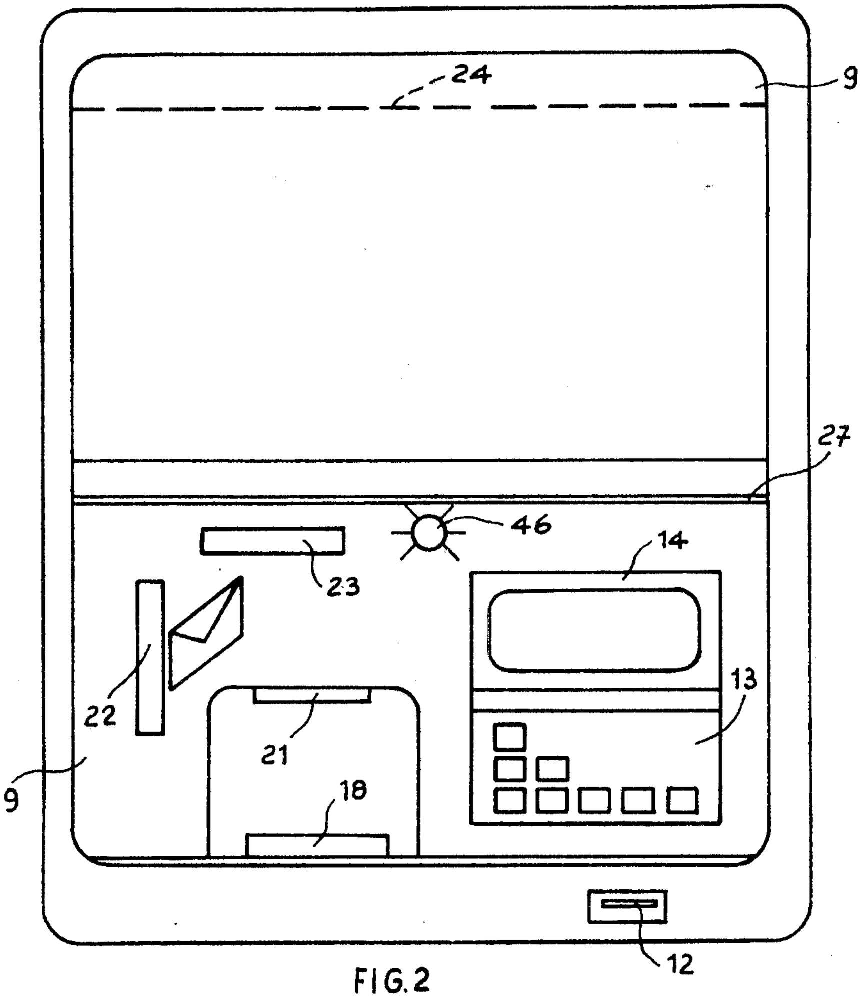
FIG. 2 is a front view of the apparatus under working conditions.

The central unit 10 is then conditioned by an end-of-transaction signal generated as a result of withdrawal of the credit card followed by withdrawal of the wad of bank-notes and/or the transaction receipt, in order to close the slide-plate 24 (FIG. 1). In this case, the closure command passes through the conductor 26 to operate the servomotor so as to lower the slide-plate 24.

Figure 3:
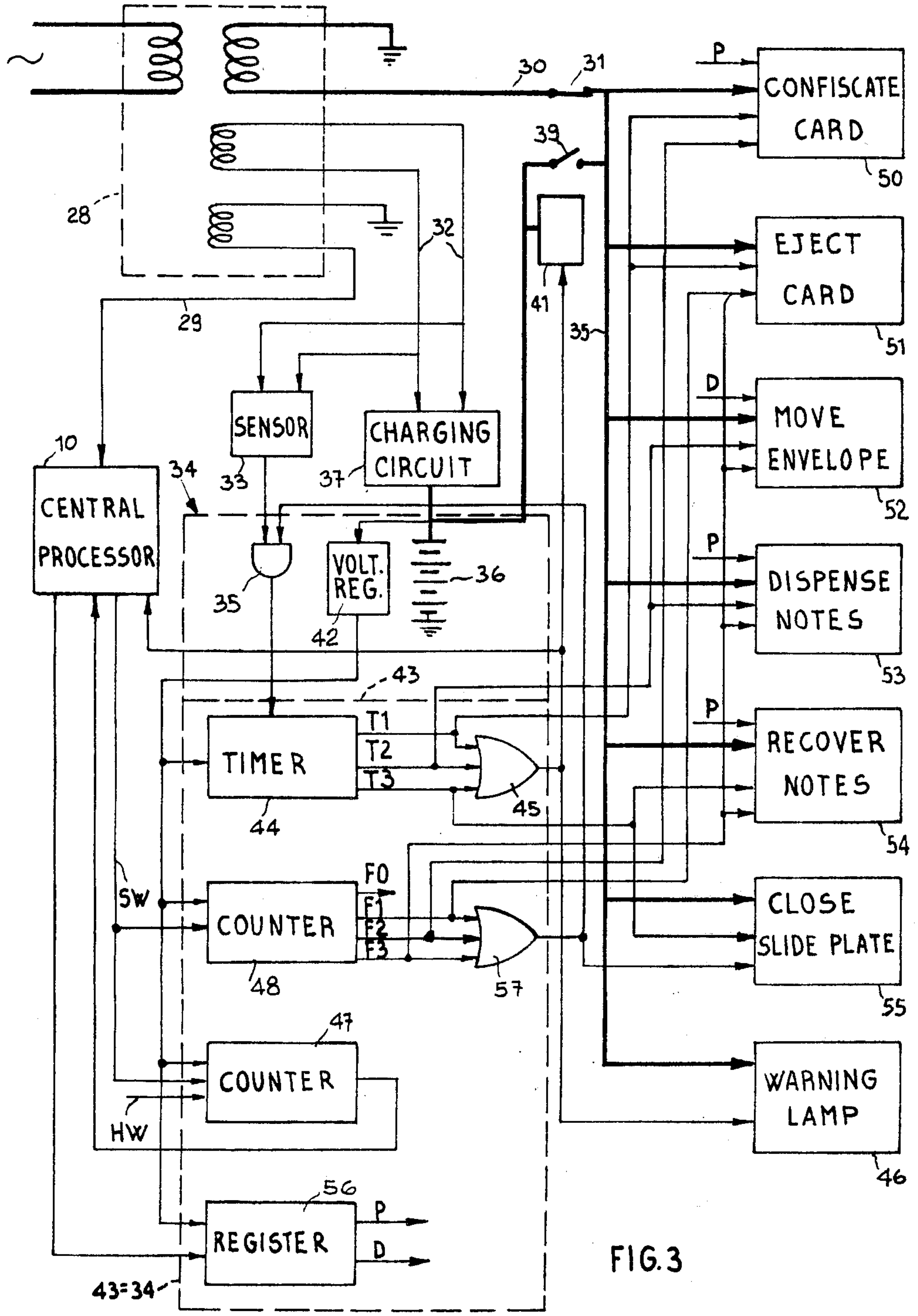
FIG. 3 is a block diagram of the power supply unit of the apparatus.

The described apparatus is supplied by a suitable power supply unit indicated overall by 28 and diagrammatically illustrated in FIG. 3. The supply unit 28 is connected to the mains and provides a first dc voltage at a conductor 29 for supplying the central unit 10, and a second dc voltage, for example 24 V, at a further conductor 30 supplying the power circuit of the various peripheral units by way of a normally closed switch 31 and a cable 35. The power supply unit 28 can also generate an ac voltage across a pair of conductors 32. This ac voltage is tested by a mains drop sensor 33 in order to operate a relay device, indicated overall by 34, for connecting an electric battery 36 to the apparatus.

Figure 4:
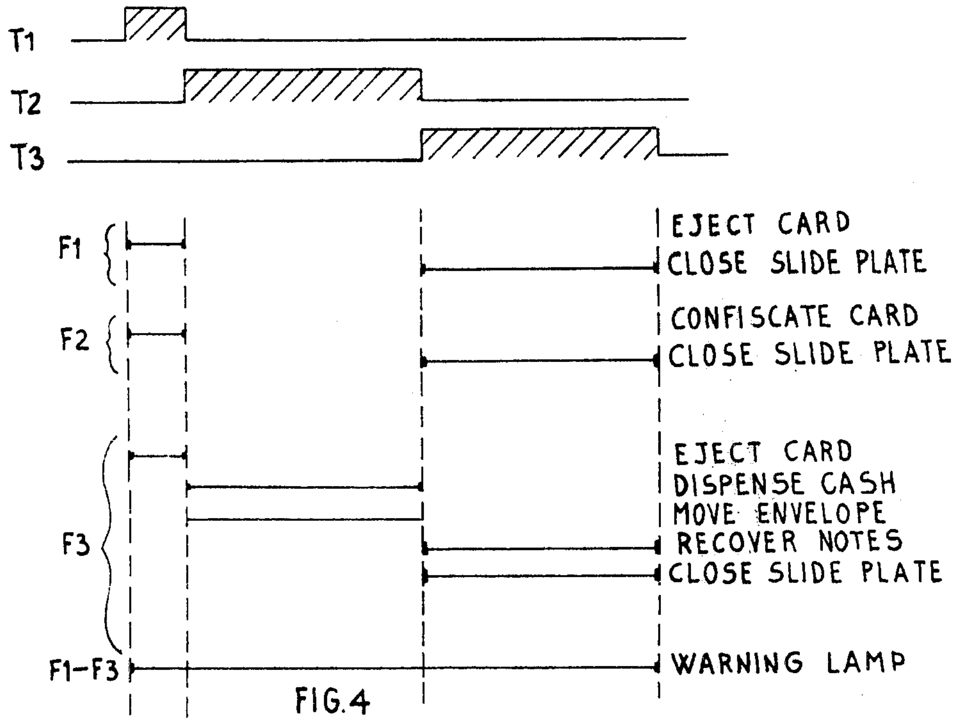
FIG. 4 is a timing diagram for the relay device.

According to the invention, the battery 36 is of the rechargeable nickel-cadmium type, and comprises sixteen 1.5 V elements in series. It is normally recharged through the conductors 32 by a recharging device 37, which comprises a rectifier, a limiting resistor and a switch which is automatically operated when charging is complete. The battery 36 is also connected to the cable 35 of the peripheral unit power circuit by a normally open switch 39. The battery 36 is also connected by way of a voltage regulator 42 to a logic circuit for the relay, indicated overall by 43. This circuit comprises a flip-flop timer 44, which is controlled by a coincidence circuit 35 when it receives a signal emitted by the sensor 33 as a result of a drop in the mains voltage during a transaction, as described hereinafter. The timer 44 generates, in succession, a signal T1 (FIG. 4) having a duration of about 5 seconds, a signal T2 of about 20 seconds and a signal T3 also of about 20 seconds. Each of these signals is arranged to inhibit the operation of the central unit 10 by way of an OR circuit 45 (FIG. 3), so that the controls of the central unit 10 on the peripheral unit are inactivated, and the execution of the withdrawal or deposit program is interrupted. The signal emitted by the OR 45 also causes a warning lamp 46 disposed on the panel 9 (FIG. 2) to light, to indicate that the central unit 10 is out of action, and causes the switch 39 to close and the switch 31 to open by way of a relay 41 supplied by the battery 36.

The logic unit 43 of the relay device 34 also comprises means for indicating the executed program stage, these comprising a sixteen position counter 47 which is incremented by HW signals emitted by the peripheral units at the end of determined operations. Said indicating means also comprise a counter 48 with four positions 0–3 which is incremented by SW signals emitted by the central unit 10 executing determined program instructions, to indicate that a determined stage of the transaction has been executed. The counter 48 correspondingly emits four signals F0–F3 which constitute decoding of the executed stage. These signals, in combination with the signals T1–T3 emitted by the timer, control the control circuits of the devices relating to the functions to be performed at any given time, i.e. a circuit 50 of the device for causing the credit card to be confiscated within the unit 11, a circuit 51 of the device for causing the credit card to be expelled from the unit 11, a circuit 52 of the device for moving the deposit envelope, possibly in transit in the unit 23, a circuit 53 of the device for delivering the wad of bank-notes to the customer, included in the unit 17, a circuit 54 of the device for recovering bank-notes possibly forgotten by the customer, also included in the unit 17, and by way of an OR circuit 57 a circuit 55 for controlling the closure of the anti-vandal slide-plate 24. The signal from the OR circuit 57 acting on the circuit 35 controls the timer 44 only during mains interruptions which occur during one of the transaction stages. The SW signals also increment the counter 47, to indicate that in addition to executing determined operations, the central unit 10 has completely executed the corresponding stage of the program. The counters 47 and 48 are supplied continuously by the battery 36, because of which they are kept in their attained position for at least 200 hours after the voltage drop. The counter 47 can thus indicate to the central unit 10, when mains supply is restored, the operations which have already been effected in the interrupted transaction. For this purpose, the counter 47 is not explorable but is reset automatically by the central unit 10 on return of mains voltage, by means of a number of pulses which exactly indicate to said central unit 10 the point of interruption of the program, and thus the operations effected by the relay device 34.

Finally, the circuit 43 comprises a register 56 connected to the central unit 10 and arranged to generate a signal P when the withdrawal code is executed on the keyboard 13, and to generate a signal D when the deposit code is executed on the keyboard 13.

The operation of the relay device is described hereinafter with reference to the apparatus flow diagram shown in FIG. 5.

Normally the apparatus, connected to the power supply unit 28 (FIG. 3), is at rest, i.e. on stand-by, with the anti-vandal slide-plate 24 (FIG. 1) closed and the counters 47 and 48 (FIG. 3) at zero. The counter 48 thus indicates that the apparatus is at stage 0.

Figure 5:
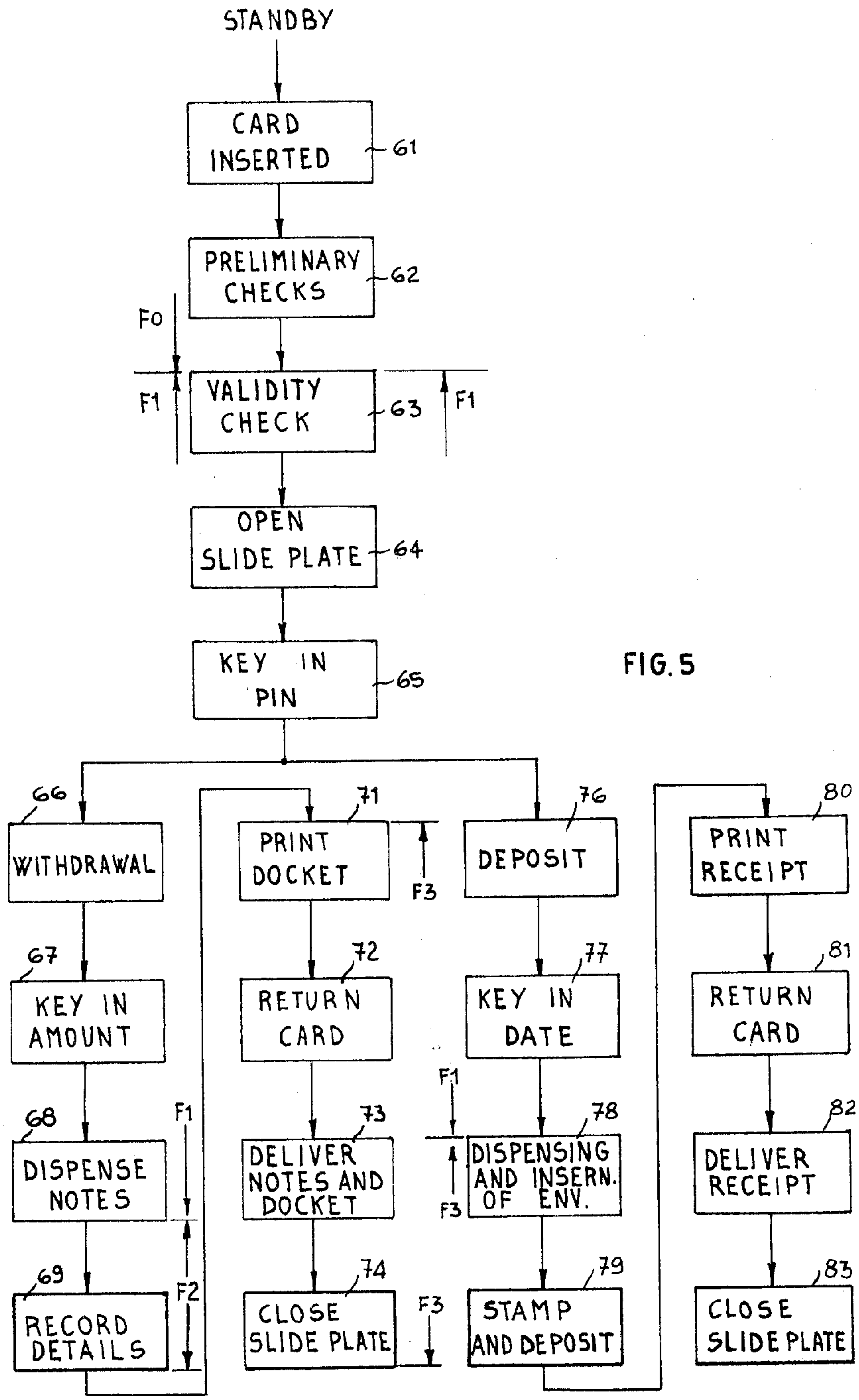
FIG. 5 is a flow diagram of an operational program of the apparatus.

The customer firstly inserts the credit card into the unit 11 (operation 61 in FIG. 5). The unit 11 then makes preliminary checks on the card. If the result of these checks is positive, the central unit 10 (FIG. 3) generates a SW signal which increments both the counter 47 and the counter 48. The counter 47 is also incremented following the execution of various operations of the individual devices, during all stages of the program.

Following said SW signal, the counter 48 now emits the signal F1, so indicating that stage 0 has terminated. If the mains voltage drops during stage 0, the sensor 33 does not cause the timer 44 to start, so that the switch 39 does not close and the relay device 34 does not operate. The unit 11 does not take-in the credit card, and the slide-plate 24 does not open, so that the customer can withdraw the credit card.

If no mains drop occurs during stage 0, the apparatus commences stage 1. Following operation 62 (FIG. 5) the shutter of the unit 11 is opened, so that the credit card proceeds into the unit 11 and is read thereby in order to effect the checks required for validity and for comparison with the list of credit cards to be seized (operation 63). If the result of these checks is positive, the central unit 10 causes the anti-vandal slide-plate to open (operation 64).

The customer now executes on the keyboard 13 a secret identification number (PIN) (operation 65), and if this is correct the central unit 10 allows the type of transaction to be executed on the keyboard.

If this is a withdrawal (operation 66), the register 56 (FIG. 3) now generates a signal P. The customer now sets the required sum (operation 67 in FIG. 5). Having made the required checks, the central unit 10 causes the operation 68 of the bank-note dispensing unit 17 to take place, i.e. the collection of the required number of bank-notes into a wad to be presented to the customer. Following this, the central unit 10 emits a further SW signal which increments the two counters 48 and 49. This latter now emits the signal F2, thus indicating that stage 1 is complete, the stage 2 begins.

If the mains voltage drop occurs during stage 1, the timer 44 is started by the signal F1 of the counter 48 by way of the OR circuit 57, in coincidence with the signal given by the mains voltage drop signal 33 by way of the circuit 35, so that the central unit 10 becomes inhibited by way of the OR circuit 45, and the out-of-action warning lamp 46 is lit. In addition, the OR circuit 45 causes operation of the relay 41, which closes the switch 39 and opens the switch 31, so that the battery 36 becomes connected to the actuation circuits 46, 50–55, and the power supply unit 28 is disconnected therefrom. Consequently, immediate return of the mains voltage does not interrupt the operation of the relay device 34.

During the time T1, the credit card expulsion circuit 51 is activated, and the credit card can then be withdrawn by the customer. Subsequently, during the time T3, the circuit 55 for closing the slide-plate 24 is activated. Any bank-notes which have been counted can then be fed to a drawer, of known type, provided in the unit 17 for collecting discarded bank-notes, or can be removed manually by the operator when the apparatus is returned to operation. At the end of the time T3, the lamp 46 is extinguished, the switch 31 closes and the switch 39 opens, because of which the battery 36 is again disconnected from the peripheral units. The central unit 10 is no longer inhibited, and can return automatically to operation when the mains voltage is restored.

If during stage 1 there is no voltage drop, the withdrawal program continues with the operation 69 involving recording of the withdrawn sum on the credit card by the unit 11 (FIG. 1), and of the entire transaction on the magnetic disc by the unit 15, or its transmission along the line 20 to the central computer. The operation 69 is the most delicate, and cannot be interrupted or leave any doubt that it has not been correctly carried out. Consequently, at the end of this recording operation, the central unit 10 emits a new SW signal which increments the two counters 48 and 49, because of which the counter 48 emits the signal F3.

If a voltage drop occurs during stage 2, the signal F2 from the counter 48 (FIG. 3) switches the relay device 34 in a manner similar to the preceding case. During the time T1, the credit card confiscation circuit 50 is activated, so that the operator can subsequently intervene to cancel the incomplete recording, i.e. the operation 69. During the time T3, the same operations are carried out as in the case of stage 1, so that the circuit 55 is activated to close the slide-plate 24. Thus, in stages 1 and 2, the transaction which has commenced is not completed, but is suppressed.

If there has been no mains drop during stages 0, 1 and 2, after the data have been recorded (operation 69), the central unit 10 (see also FIG. 1) conditions the printer 19 so that it prints the effected transaction (operation 71) on a document for the customer and/or for the bank ledger. The central unit 10 then causes the unit 11 to return the credit card to the customer (operation 72) and causes the units 17 and 19 to present to the customer the wad of bank-notes and the receipt (operation 73). Finally, the slide-plate 24 is closed (operation 74). The central unit emits a further SW signal which zeroes the counter 47 and the counter 48, which now emits the signal F0, by which the apparatus returns to its stand-by state.

If a mains voltage drop occurs during stage 3, the sensor 33 (FIG. 3) switches the relay device 34 as in the two preceding cases. This time, the signal F3 of the counter 48, in coincidence with the time signal T1, activates the credit card expulsion circuit 51. Then during the time T2, under the control of the signal P, the circuit 53 is activated so that it presents the already counted money to the customer. The receipt is also presented to the customer but only if it has been printed. In this respect, it does not constitute a true accounting document, but only a reminder for the customer. Also under the control of the signal P, during the time T3 the signal F3 activates the circuit 54 for recovering the bank-notes should the distracted customer not have withdrawn them. Finally, the circuit 55 closes the slide-plate 24 as in the preceding cases.

When the customer intendes to make a deposit, after operation 65 (FIG. 5) he executes the deposit code (operation 76) on the keyboard 13, on which the register 56 emits the signal D. The customer then executes the data relative to the deposit (operation 77). In reply, the unit 22 (FIG. 1) dispenses the envelope, and after the customer has placed the bank-notes in the envelope he inserts it into the unit 23 (operation 78). As soon as the unit 23 signals insertion of the envelope, the central unit 10 emits the second SW signal, which causes the counter 48 to emit the signal F2, with which stage 1 of the transaction closes.

If a voltage drop occurs during stage 1, the relay device 34 operates as in the case of the withdrawal, to cause the credit card to be expelled during time T1 and close the slide-plate 24 during time T3. If however there has been no interruption, the central unit 10 immediately emits a further SW signal, for which the counter 48 emits the signal F3 and stage 2 is omitted in practice. The unit 23 now moves the inserted envelope into the stamping zone, then transfers it into the deposit drawer (operation 79). The unit 19 now prints the receipt (operation 80). The unit 11 then returns the credit card to the customer (operation 81), and the unit 19 presents the receipt to the customer (operation 82). Finally, the slide-plate 24 is closed (operation 83) and the central unit 10 emits a SW signal, as a result of which the counter 48 is returned to the F0 condition.

If a voltage drop occurs during stage 3, the relay device 34 causes the credit card to be expelled during time T1, as in the case of the withdrawal, then under the control of the signal D causes the circuit 52 to complete the stamping and depositing of the inserted envelope during the time T2, and during the time T3 causes the circuit 55 to close the slide-plate 24.

It is therefore apparent that the relay device controls an emergency cycle, of which the times coinciding with the stage under execution at the moment of the interruption selectively operate the peripheral units, in order to perform the functions necessary for closing the interrupted transaction in a defined manner intelligible to the central unit.

It is apparent that various modifications and improvements can be made to the described apparatus without leaving the scope of the invention. For example, for the withdrawal transaction the printing of the receipt could be included in stage 2. Moreover, for the deposit transaction a stage 2 could be provided which includes stamping of the envelope and possible recording of the executed transaction on the credit card. Any mains drop during this stage could cause the credit card to be seized, in order to subsequently enable the transaction to be regularised manually.

We claim:

1. Apparatus for depositing and/or withdrawing bank-notes by means of credit cards, comprising a central unit, a series of peripheral units operable by said central unit in accordance with a program corresponding to determined commands, a power supply unit operated by the mains voltage in order to supply said central unit and said peripheral units, and a relay device sensitive to a drop in said mains voltage in order to connect said apparatus to an electric battery, characterised by means which indicate the program stage executed in order to give rise to a modification of said program which depends on said stage.

2. Apparatus as claimed in claim 1, characterised in that said program modification is effected by selectively operating said peripheral units in order to perform the functions essential for closing the interrupted transaction in a defined manner intelligible to the central unit.

3. Apparatus as claimed in claim 1 or 2, characterised in that said indicating means comprise a counter able to be incremented by a signal emitted by said central unit at the end of execution of said program stage.

4. Apparatus as claimed in claim 3, characterised in that said program modification is effected by an emergency cycle controlled by a timer, said peripheral units being controlled by time signals emitted by said timer which coincide with stage signals emitted by said counter.

5. Apparatus as claimed in claim 4, characterised in that said battery is able to be connected to said counter in order to maintain it in its attained state, at least for the duration of said cycle.

6. Apparatus as claimed in claim 3, characterised in that said indicating means comprise a second counter able to be incremented by signals emitted by said central units in order to indicate that an operation has been executed, and by said signals emitted by the central unit.

7. Apparatus as claimed in claim 5, characterised in that said second counter is able to be read by said central unit, said battery being arranged for connection to said second counter for a period sufficiently long to allow said reading on restoration of the mains voltage.

8. Apparatus as claimed in claim 4 and one of claims 5 to 7, characterised by means controlled by said timer in order to exclude reconnection of said mains voltage during the emergency cycle, indicator means being provided for externally indicating that said emergency cycle has been executed.

9. Apparatus as claimed in claim 1, comprising a normally open anti-vandal slide-plate arranged to be closed during the execution of said program, characterised in that in all cases said program modification includes the opening of said anti-vandal slide-plate.

10. Apparatus as claimed in claim 4, in which the credit card is retained during the transaction for recording the effected transaction thereon, and in which a device is provided for seizing the credit card, at least when it is recognised as invalid or expired, characterised in that when said counter indicates that a stage including the recording of said transaction is under execution, it causes said device to seize the credit card.

11. Apparatus as claimed in claim 1, characterised in that said battery can be recharged by means of a circuit supplied by said power supply unit, a sensor sensitive to mains voltage drop being connected in parallel with said circuit.

12. Apparatus as claimed in claim 11, characterised in that said sensor is arranged to close a switch in the connection line between said battery and said peripheral units, and to simultaneously open a switch in the connection line between said power supply unit and said apparatus.

* * * * *

UNITED STATES PATENT AND TRADEMARK OFFICE
CERTIFICATE OF CORRECTION

PATENT NO. : 4,359,630

DATED : November 16, 1982

INVENTOR(S) : Simonotti et al

It is certified that error appears in the above—identified patent and that said Letters Patent is hereby corrected as shown below:

Column 5, line 32, delete "48" and insert --47--;

Column 5, line 32, delete "49" and insert --48--;

Column 5, line 38, delete "signal" and insert --sensor--;

Column 6, line 5, delete "48" and insert --47--;

Column 6, line 5, delete "49" and insert --48--;

Column 8, line 15, claim 6, delete "central" and insert --peripheral--;

Column 8, line 30, claim 9, delete "open" and insert --closed--;

Column 8, line 31, claim 9, delete "closed" and insert --open--; and

Column 8, line 33, claim 9, delete "opening" and insert --closing--.

Signed and Sealed this

*Twenty-sixth* Day of *June 1984*

[SEAL]

*Attest:*

GERALD J. MOSSINGHOFF

*Attesting Officer* *Commissioner of Patents and Trademarks*